US008855706B2

(12) United States Patent
Clevorn

(10) Patent No.: US 8,855,706 B2
(45) Date of Patent: Oct. 7, 2014

(54) COMMUNICATION TERMINALS AND METHODS FOR CONTROLLING A RECEIVER OF A COMMUNICATION TERMINAL

(75) Inventor: Thorsten Clevorn, Duesseldorf (DE)

(73) Assignee: Intel Mobile Communications GmbH, Neubiberg (DE)

(*) Notice: Subject to any disclaimer, the term of this patent is extended or adjusted under 35 U.S.C. 154(b) by 0 days.

(21) Appl. No.: 13/293,243

(22) Filed: Nov. 10, 2011

(65) Prior Publication Data

US 2013/0121394 A1 May 16, 2013

(51) Int. Cl.
H04M 1/00 (2006.01)
H04B 7/08 (2006.01)
H04W 52/02 (2009.01)

(52) U.S. Cl.
CPC ......... H04W 52/0229 (2013.01); H04B 7/0871 (2013.01)
USPC ...................... 455/550.1; 455/452.1; 370/328

(58) Field of Classification Search
USPC ................ 455/450, 451, 452.1, 452.2, 550.1; 370/328
See application file for complete search history.

(56) References Cited

U.S. PATENT DOCUMENTS

| 7,391,723 B2* | 6/2008 | Collette et al. ............... 370/230 |
| 7,925,302 B2 | 4/2011 | Ulupinar et al. | |
| 8,447,316 B2* | 5/2013 | Martin et al. ............ 455/452.1 |
| 2001/0007574 A1* | 7/2001 | Liu et al. ...................... 375/219 |
| 2004/0253955 A1 | 12/2004 | Love et al. | |
| 2005/0245197 A1* | 11/2005 | Kadous et al. ............. 455/67.13 |
| 2006/0276130 A1 | 12/2006 | Waxman | |
| 2010/0278158 A1* | 11/2010 | Lee et al. ..................... 370/338 |

FOREIGN PATENT DOCUMENTS

| JP | 2006-203820 A | 8/2006 |
| WO | 2008/071600 A1 | 6/2008 |
| WO | 2013/068203 A2 | 5/2013 |
| WO | 2013/068203 A3 | 6/2013 |

OTHER PUBLICATIONS

International Search report and Written Opinion received for PCT Application No. PCT/EP2012/070405, mailed on May 16, 2013, 14 pages.
International Preliminary Report on Patentability received for PCT Patent Application No. PCT/EP2012/070405, mailed on May 22, 2014, 10 pages.

* cited by examiner

Primary Examiner — Nhan Le

(57) ABSTRACT

A communication terminal is described comprising a determiner configured to determine, for at least one communication connection of the communication terminal, a type of the physical channel used by the communication connection and a type of data transmitted via the communication connection and a controller configured to control a receiver of the communication terminal to use a reception performance enhancement functionality depending on the type of the physical channel and the type of data transmitted via the communication connection.

12 Claims, 6 Drawing Sheets

… (1)

COMMUNICATION TERMINALS AND METHODS FOR CONTROLLING A RECEIVER OF A COMMUNICATION TERMINAL

TECHNICAL FIELD

The present disclosure relates to communication terminals and methods for controlling a receiver of a communication terminal.

BACKGROUND

Modern communication terminals typically have reception performance enhancement functionalities like receive diversity, equalization and interference cancellation.

SUMMARY

In one embodiment, a communication terminal is provided including a determiner configured to determine, for at least one communication connection of the communication terminal, a type of the physical channel used by the communication connection and a type of data transmitted via the communication connection and a controller configured to control a receiver of the communication terminal to use a reception performance enhancement functionality depending on the type of the physical channel and the type of data transmitted via the communication connection.

In another embodiment, a communication terminal is provided including a determiner configured to determine, based on priority information for at least one of a plurality of communication connections of the communication terminal, a communication connection of the plurality of communication connections based on which it should be decided whether a reception performance enhancement functionality of the communication terminal is to be used and a controller configured to control a receiver of the communication terminal to use the reception performance enhancement functionality depending on a characteristic of the determined communication connection.

According to further embodiments, methods for controlling a receiver of a communication terminal according to the communication terminals described above are provided.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which.

DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

Figure 1:
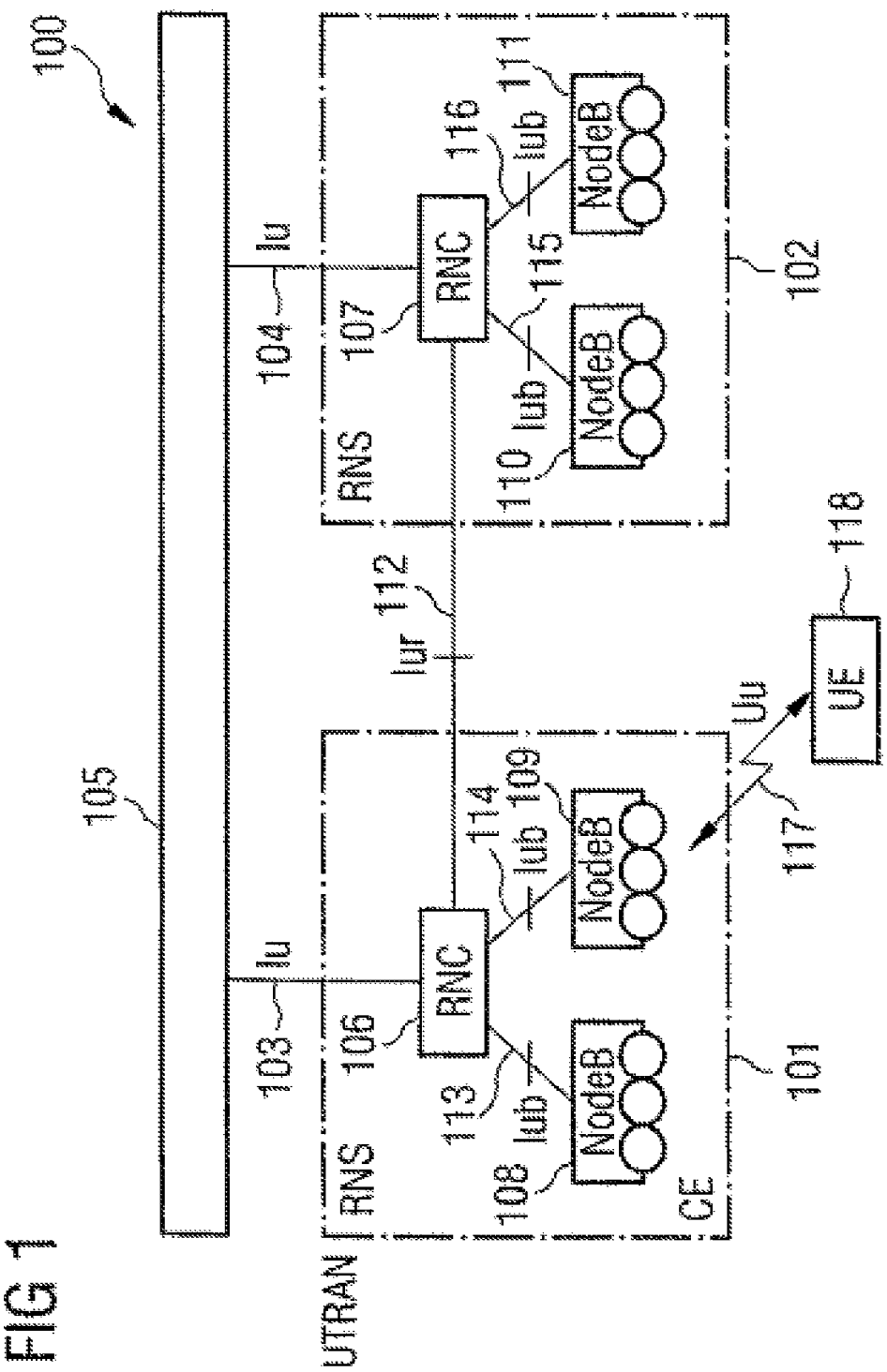
FIG. 1 shows a communication system according to an embodiment.

FIG. 1 shows a communication system 100 according to an embodiment.

The communication system 100 is a cellular mobile communication system (also referred to as cellular radio communication network in the following) including a radio access network (e.g. an UTRAN, UMTS (Universal Mobile Telecommunications System) Terrestrial Radio Access Network), which has a plurality of mobile radio network subsystems (RNS) 101, 102, which are respectively connected to the UMTS core network (CN) 105 by means of what is known as an Iu interface 103, 104. The radio access network and the core network 105 are also referred to as the network side (or as the mobile communication network) of the mobile communication system.

A mobile radio network subsystem 101, 102 respectively has a mobile radio network control unit (Radio Network Controller, RNC) 106, 107 and one or more UMTS base stations 108, 109, 110, 111, which are also called NodeB in line with UMTS.

Within the mobile radio access network, the mobile radio network control units 106, 107 of the individual mobile radio network subsystems 101, 102 are connected to one another by means of what is known as an Iur interface 112. Each mobile radio network control unit 106, 107 monitors the allocation of mobile radio resources in all mobile radio cells in a mobile radio network subsystem 101, 102.

A UMTS base station 108, 109, 110, 111 is respectively connected to a mobile radio network control unit 106, 107 associated with the UMTS base station 108, 109, 110, 111 by means of what is known as an Iub interface 113, 114, 115, 116.

Each UMTS base station 108, 109, 110, 111 provides radio coverage for one or more mobile radio cells (CE) within a mobile radio network subsystem 101, 102. Control and user data are transmitted between a respective UMTS base station 108, 109, 110, 111 and a mobile terminal 118 (also referred to as UE, user equipment, e.g. a mobile phone), in a mobile radio cell using an air interface, called Uu air interface 117 in line with UMTS, e.g. on the basis of a multiple access method.

According to one embodiment, the mobile terminal 118 can have certain enhancement functionalities (or features), which for example include processing a received signal according to a certain algorithm, which can be used to improve the performance of reception of signals from the base station 108, 109, 110, 111, i.e. can be used to enhance the reception of data from the base station 108, 109, 110, 111, such that, for example, a lower transmission power is required for the same quality of reception (e.g. for the same number of transmission errors). Examples for such enhancement functionalities may for example include:

Receive diversity (RxDiv)
Equalization
Interference cancellation

Such a reception performance enhancement functionality typically requires some computational power (e.g. for carrying out the processing of the received signal values), which typically increases the power consumption of the mobile terminal 118 when it is used by the mobile terminal 118, i.e. when the enhancement functionality is activated in the mobile terminal 118.

For example, receive diversity (RxDiv) can significantly improve the demodulation performance of a mobile terminal However, using RxDiv increases the power consumption of the mobile terminal by, e.g. a second active RF (radio frequency) reception path and required additional baseband processing. An extension to RxDiv is dynamic RxDiv where RxDiv is not switched on statically but is dynamically switched on when needed (e.g. when it is considered to be sufficiently beneficial to justify the increased power consumption) and is switched off otherwise to save power.

It is desirable to optimally configure the mobile terminal with regard to the activation/deactivation of a performance enhancement functionalities for all the different possible use cases.

In case of a UMTS communication system supporting HSDPA (High Speed Downlink Packet Access), for example, RxDiv may for example be activated/deactivated based on a differentiation between whether data are transmitted according to HSDPA or, for example, according to Rel99/DCH (i.e. using a dedicated channel according to Release 99 of UMTS). For example, for reception of data according to HSDPA, RxDiv is switched on as default option because with RxDiv enabled a data download can be carried out in shorter time and the power saving due to the shorter download time typically overcompensates the additional power consumption required by RxDiv. (Of course, if only a HSDPA link is established but no HSDPA packets are received the mobile terminal can turn RxDiv off.)

In contrast, for a voice call using a data transmission according to Rel99/DCH, RxDiv may be turned off as default since the call is not shortened by using RxDiv. Here, RxDiv may for example be switched on only in bad reception conditions to avoid a call drop, for example.

Alternatively, the decision whether to activate/deactivate RxDiv may be based on the type of the radio access bearers (RAB) used in the data transmission, e.g. based on whether there are signaling radio access bearers, circuit switched (CS) radio access bearers and/or packet switched (PS) radio access bearers active (i.e. established for the mobile terminal). This may also be seen as a decision based on the type of data transmitted to and/or from the mobile terminal, e.g. whether signaling data, circuit-switched or packet switched data is transmitted to/from the mobile terminal. For example, RxDiv may be enabled for all packet-switched communication connections, independent from the type of the receiver (e.g. HSDPA receiver or Rel99/DCH receiver) by which the packet-switched radio access bearer is received, to have a throughput gain. Alternatively, RxDiv may be disabled in case that a packed-switched radio access bearer is active to avoid the high power consumption for long download to save battery time, avoid overheating, etc.

Embodiments can be seen to provide more flexibility and enable better configurations compared to the approaches described above. For example, according to various embodiments, a distinction is made between static and dynamic RxDiv for radio access bearers and/or a priority option and/or a general and smart radio bearer activity detection are provided.

Figure 2:
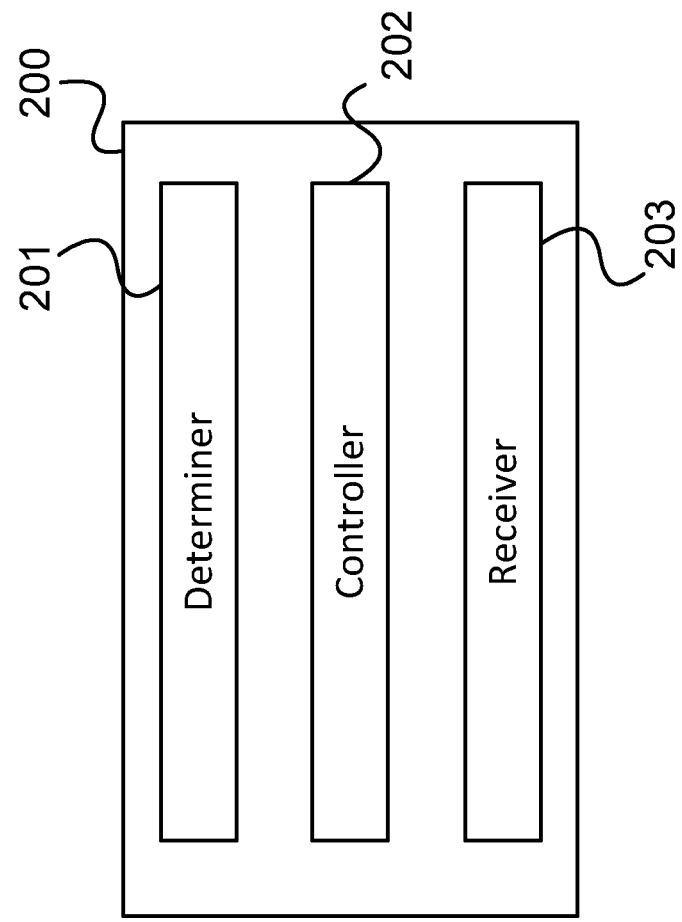
FIG. 2 shows a communication terminal according to an embodiment.

FIG. 2 shows a communication terminal 200 (e.g. a mobile communication terminal) according to an embodiment.

The communication terminal 200 includes a determiner 201 configured to determine, for at least one communication connection of the communication terminal, a type of the physical channel used by the communication connection and a type of data transmitted via the communication connection.

The communication terminal 200 further includes a controller 202 configured to control a receiver 203 of the communication terminal to use a reception performance enhancement functionality depending on the type of the physical channel and the type of data transmitted via the communication connection.

In one embodiment, in other words, it is decided whether a reception performance functionality should be used by a mobile terminal for a data transmission (or a communication connection) based on a combination of the physical channel type used for the data transmission and the type of data transmitted. The communication connection may for example correspond to a radio access bearer such that the physical channel type is the physical channel type of the radio access bearer and the data type is the data type of the radio access bearer.

According to one embodiment, the reception enhancement functionality is at least one of receive diversity, equalization and interference cancellation.

According to one embodiment, the type of physical channel includes the type of radio access technology according to which the physical channel is provided.

The type of physical channel for example specifies whether the physical channel is a HSDPA physical channel or a Rel99/DCH physical channel.

According to one embodiment, the type of data is given by a transmission mode of the data. This means, for example, that the type of data specifies whether the data is circuit-switched data, packet-switched data, streaming data, burst data. This may also include that the data type is given by the packet size of packet-switched data.

The type of data may include whether the data is signaling data or useful data.

According to one embodiment, the type of data is the type of a communication service in context of which the data are transmitted via the communication connection. This means, for example, that the type of data specifies whether the data is MMS (multimedia message service) data, streaming service data, Internet browsing data, voice call data, videoconferencing data or file download data. In other words, the type of data can be seen to specify the type of application for which the communication connection is used.

The communication terminal may further include a memory storing, for each combination of a plurality of combinations of a type of physical channel of a plurality of physical channel types and a type of data of a plurality of data types transmitted via the communication connection, an indication specifying whether the reception performance enhancement functionality is to be used for the combination.

For example, the controller is configured to control the receiver of the communication terminal to use the reception performance enhancement functionality if the memory stores an indication for the combination of the type of physical channel and the type of data transmitted via the communication connection indicating that the reception performance enhancement functionality is to be used.

The memory for example stores, for the combination of the type of physical channel and the type of data transmitted via the communication connection, a criterion which has to be fulfilled for the reception performance enhancement functionality to be used for the combination.

The controller may be configured to control the receiver of the communication terminal to use the reception performance enhancement functionality if the criterion is fulfilled.

According to one embodiment, the controller is configured to control the receiver of the communication terminal to use the reception performance enhancement functionality further depending on the amount of data transmitted via the communication connection. The amount of data may be an amount of data transmitted in a predetermined time period and thus correspond to a data rate.

Figure 3:
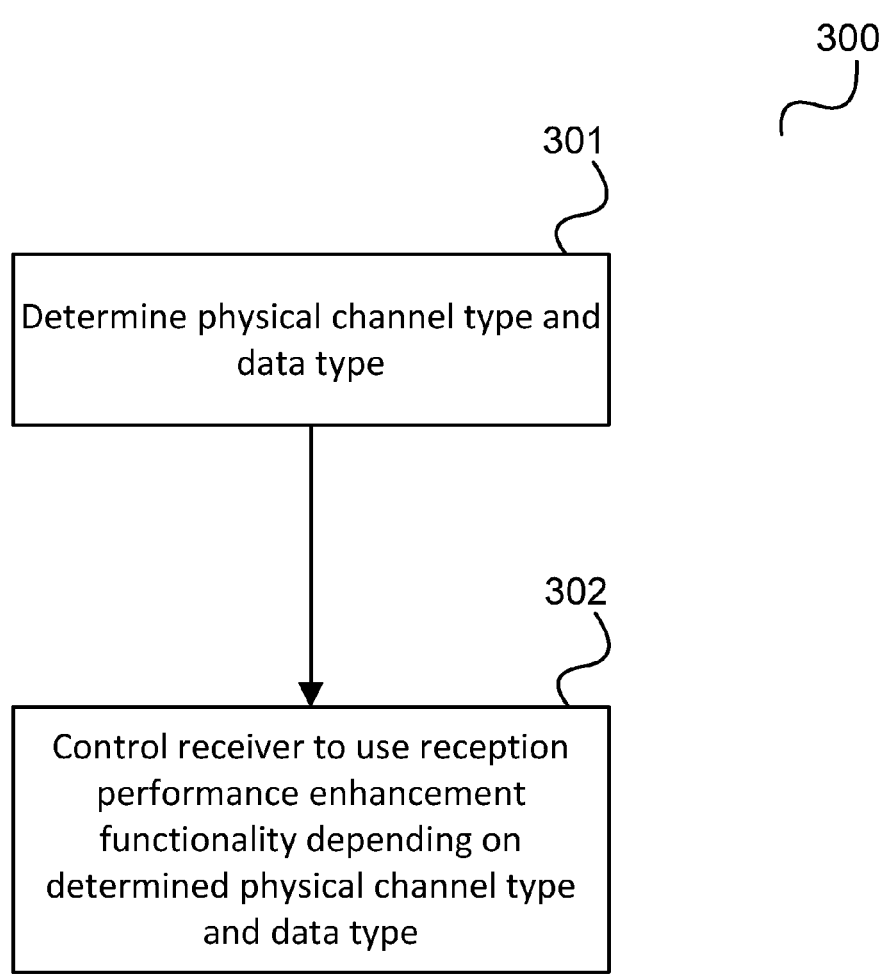
FIG. 3 shows a flow diagram according to an embodiment.

The communication terminal 200 is for example carries out a method as illustrated in FIG. 3.

FIG. 3 shows a flow diagram 300 according to an embodiment.

The flow diagram 300 illustrates a method for controlling a receiver of a communication terminal.

In 301, for at least one communication connection of the communication terminal, a type of the physical channel used by the communication connection and a type of data transmitted via the communication connection are determined.

In 302 a receiver of the communication terminal is controlled to use a reception performance enhancement functionality depending on the type of the physical channel and the type of data transmitted via the communication connection.

Figure 4:
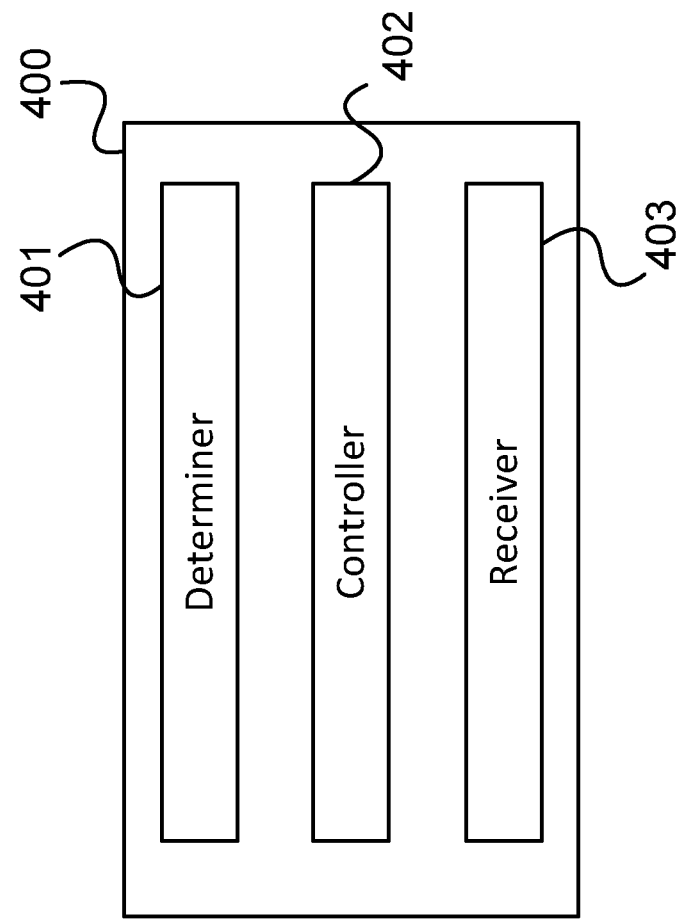
FIG. 4 shows a communication terminal according to an embodiment.

FIG. 4 shows a communication terminal 400 (e.g. a mobile communication terminal) according to an embodiment.

The communication terminal 400 includes a determiner 401 configured to determine, based on priority information for at least one of a plurality of communication connections of the communication terminal, a communication connection of the plurality of communication connections based on which it should be decided whether a reception performance enhancement functionality of the communication terminal is to be used.

The communication terminal 400 further includes a controller 402 configured to control a receiver 403 of the communication terminal to use the reception performance enhancement functionality depending on a characteristic of the determined communication connection.

According to one embodiment, in other words, it may be set (by means of a corresponding priority) which communication connection (or which communication connections) of a plurality of communication connections of the communication terminal decides (or decide) about the usage of a performance enhancement functionality. In other words, if based on one communication connection it would be decided that the performance enhancement functionality is to be used (e.g. because it is a HSDPA connection) while on another communication connection it would be decided that the performance enhancement functionality is not to be used (e.g. because it is a Rel99/DCH connection), it is decided whether the performance enhancement functionality is used based on a prioritization of the communication connections such that the decision based on the communication connection (or the communication connections) with the higher priority is decisive.

The communication connections may also be communication connections using different communication networks. For example, the communication terminal 400 may have two subscriber identity modules (SIMs or USIMs) and have communication connections to different mobile communication networks, i.e., e.g. communication networks operated by different operators. In this case, one communication network (i.e. one subscriber identity module) may be prioritized with respect to the other such that the decision based on a communication connection using the prioritized communication network overrules, if it is present, a decision based on a communication connection using the communication network which is not prioritized.

More than one communication connection may have the same (highest) priority. In this case, it may decided depending on the characteristics of all these communication connections whether the reception enhancement functionality should be used, e.g. according to a predetermined rule. For example, if according to at least one of these communication connections the reception enhancement functionality is to be used, the reception enhancement functionality is used. Alternatively, for example, if according to at least one of these communication connections the reception enhancement functionality is not to be used, the reception enhancement functionality is not used.

According to one embodiment, the characteristic of the communication connection is a type of data transmitted via the communication connection.

According to one embodiment, the characteristic of the communication connection is a type of the physical channel used by the communication connection.

The communication terminal may further include a memory storing the priority information.

According to one embodiment, the determiner is configured to determine priority information for the communication connection based on at least one of a type of the physical channel used by the communication connection and a type of data transmitted via the communication connection.

The communication terminal may further include a memory storing at least one of a priority level for each type of physical channel of a plurality of types of physical channels and a priority level for each type of data of a plurality of types of data wherein the determiner is configured to determine the priority information based on at least one of the stored priority level of the type of the physical channel used by the communication connection and the stored priority level of the type of data transmitted via the communication connection.

According to one embodiment, the determiner is configured to determine the communication connection of the plurality of communication connections based on which it should be decided whether a reception performance enhancement functionality of the communication terminal is to be used based on a comparison of priority levels of the communication connection of the plurality of communication connections.

The determiner may be configured to determine the communication connection of the plurality of communication connections based on which it should be decided whether a reception performance enhancement functionality of the communication terminal is to be used as a communication connection having the highest priority level among the plurality of communication connections.

Figure 5:
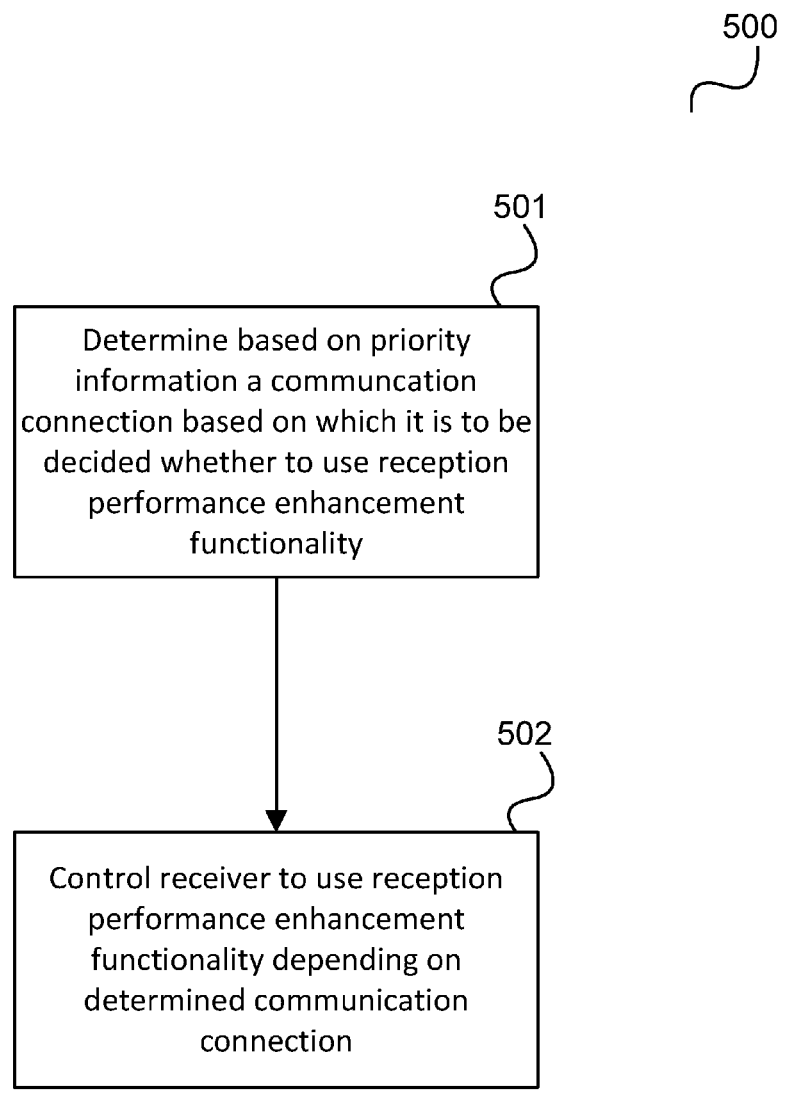
FIG. 5 shows a flow diagram according to an embodiment.

The communication terminal 400 for example carries out a method as illustrated in FIG. 5.

FIG. 5 shows a flow diagram 500 according to an embodiment.

The flow diagram 500 illustrates a method for controlling a receiver of a communication terminal In 501, based on priority information for at least one of a plurality of communication connections of the communication terminal, a communication connection of the plurality of communication connections is determined based on which it should be decided whether a reception performance enhancement functionality of the communication terminal is to be used.

In 502, a receiver of the communication terminal is controlled to use the reception performance enhancement functionality depending on a characteristic of the determined communication connection.

It should be noted that the features of the communication terminal described with reference to FIG. 2 and the communication terminal described with reference to FIG. 4 may be combined (and, analogously, the features of the methods described in FIGS. 3 and 5). Further, it should be noted that embodiments described in context with one of the communication terminals or one of the methods are analogously valid for the other communication terminal(s) and the other method(s).

An exemplary embodiment is described in the following with reference to FIG. 6.

Figure 6:
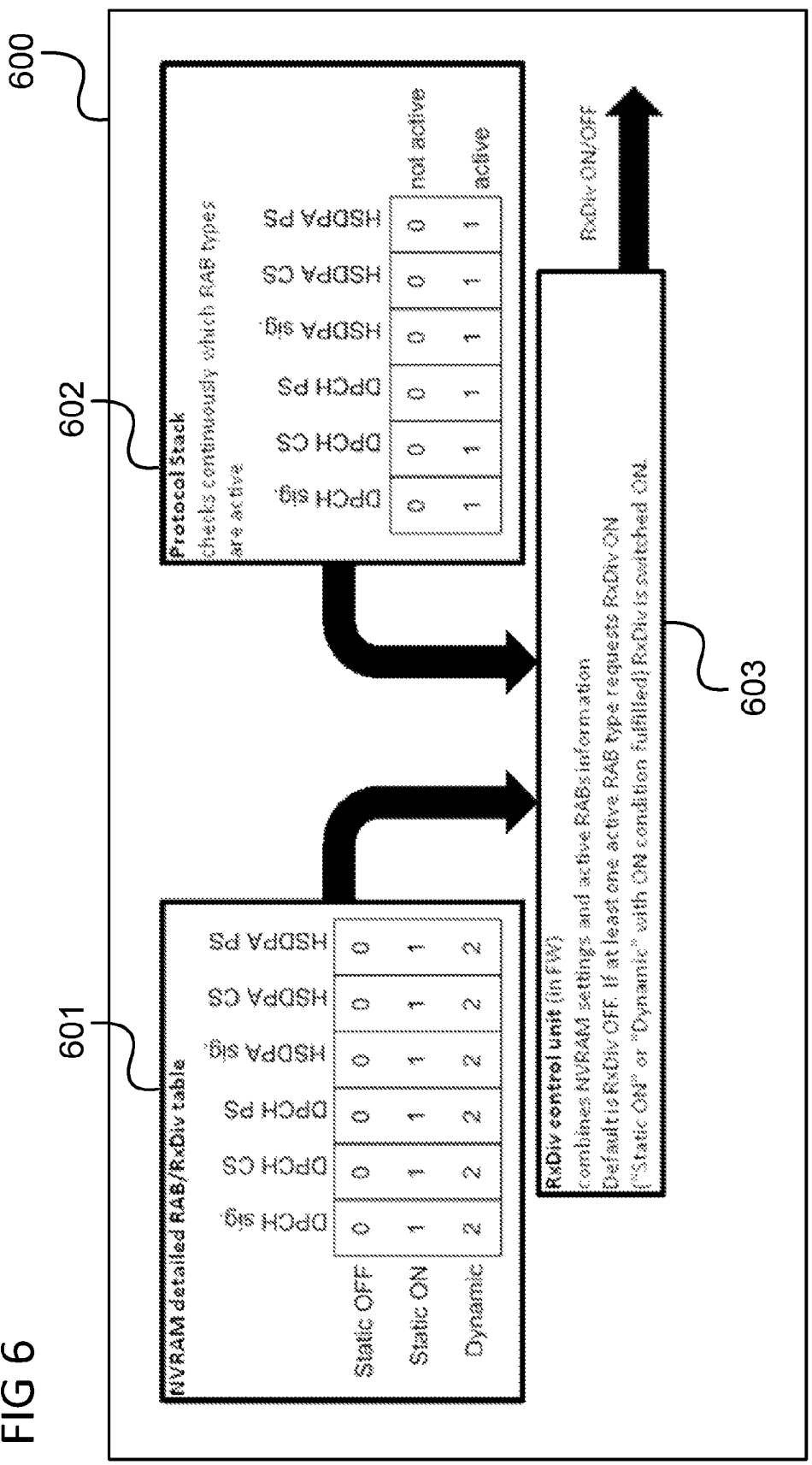
FIG. 6 shows a communication terminal according to an embodiment.

FIG. 6 shows a communication terminal 600 according to an embodiment.

The communication terminal 600 may correspond to any one of the communication terminals 118, 200, 400 shown in FIGS. 1, 2 and 4. It should be noted that in FIG. 6, only components involved in the decision about the usage of a performance enhancement functionality are shown. The communication terminal 600 may include further components such as one or more antennas, one or more RF transceivers (e.g. a plurality of antennas and RF transceivers to support RxDiv), a baseband processor etc.

The decision about the usage of a performance enhancement functionality as described with reference to FIG. 2 may be seen as a decision based on a combination of physical channel type and data type. In the example shown in FIG. 6, the physical channel is either a Dedicated Physical Channel (DPCH) e.g. according to Rel99 or a HSDPA physical channel (i.e. a HS-PDSCH, a HS-DPCCH or a HS-SCCH). In other words, the physical channel type is in this example "DPCH" or "HSDPA physical channel " (or just "HSDPA). Further, the data type is in this example "PS" (packet-switched data), "CS" (circuit-switched data) and "sig." (signaling data). It should be noted that in other embodiments, the data type may include further distinctions, e.g. there may be more than one "PS" data type, e.g. based on the packet size.

The communication terminal 600 includes a memory 601 storing a table specifying for each combination of physical channel type and data type a setting whether for this combination, the performance enhancement functionality (RxDiv in this example) should be statically turned off, statically turned on or should be dynamically turned on (i.e. should be turned on based on certain conditions, the reception quality, for example). There may for example be a plurality of levels for the dynamic setting, i.e. for the setting that the performance enhancement functionality should be dynamically turned on. For example, on a first dynamic setting, the performance enhancement functionality is to be turned on when reception quality is below a first threshold while on a second dynamic setting, the performance enhancement functionality is to be turned on when reception quality is below a second threshold. The setting for each combination of physical channel type and data type (which may be seen as a setting for each radio access bearer type) may be seen to provide a highly flexible radio access bearer specific RxDiv configuration.

The memory 601 is for example a non-volatile memory (e.g. an NVRAM).

The communication terminal 600 further includes a detector 602 (e.g. as part of a data processing component implementing the communication protocol stack) detecting what types of radio access bearer are currently active (i.e. established for the communication terminal 600), i.e. for which combination of physical channel type and data type a radio access bearer is active. In other words, the detector 602 detects for each combination of physical channel type and data type whether the communication terminal 600 has a communication connection which uses a physical channel of the physical channel type and which is used to transmit data of the data type.

The communication terminal 600 further includes a controller 603 (in this example a RxDiv control unit) which is provided by the memory 601 with the information about the settings for the combinations of physical channel type and data type and which is provided by the detector 602 with the information for which combinations of physical channel type and data type a radio access bearer is currently established. By combining the information supplied from the memory 601 with the information supplied from the detector 602, the controller 603 determines whether RxDiv is to be used by the communication terminal 600. Different combination strategies may be used, e.g., as illustrated in FIG. 6, if at least one radio access bearer is established for which RxDiv should be turned on according to the setting for this radio access bearer RxDiv is turned on (which can be seen as a more performance oriented approach). Alternatively, if at least one radio access bearer is established for which RxDiv should be turned off according to the setting for this radio access bearer RxDiv is turned off (which may be seen as a more power saving oriented approach).

According to the possible dynamic setting for a certain radio access bearer type, the controller 603 decides in addition to RxDiv on and off for the certain RAB also in case of RxDiv on which type of RxDiv, static or dynamic, shall be used. This gives high flexibility for the configuration in contrast to only a setting of RxDiv on or off for the radio access bearer. As mentioned above, the dynamic setting may be extended to include other RxDiv control parameters like thresholds for RxDiv on/off switching. Such thresholds may also be configured individually per radio access bearer.

According to one embodiment, a priority based radio access bearer specific RxDiv configuration is used. This can be seen to correspond to the functionality of the communication terminal described with reference to FIG. 4.

The controller 603 may, when combining the setting for each radio access bearer type and the information about which radio access bearers are active for the final decision about whether to use RxDiv treat all radio access bearers as equal. However, it might be desirable to give each radio access bearer type (and its RxDiv configuration, i.e. RxDiv setting) a certain priority level. Thus, in the decision done by the controller 603, an active radio access bearer with a higher priority can overrule the decision that would be made based on radio access bearers with lower priority, i.e. only the setting for the highest priority active radio access bearers is evaluated for the final decision about whether to use RxDiv.

For example, it is assumed that there is an ongoing DPCH (i.e. Rel99/DCH) PS call which also requires some DPCH signaling. Thus, DPCH sig. and DPCH PS are determined as being active by the detector 602. It is assumed that the configuration (i.e. setting) for DPCH sig. is RxDiv static off and for DPCH PS is RxDiv static ON (e.g. to have faster download). With the decision scheme illustrated in FIG. 6, this would result in RxDiv being statically on because auf the active DPCH PS.

Now, it is assumed that in addition a voice call is established based on a DPCH CS radio access bearer and the configuration for DPCH CS is RxDiv dynamic on. For the best user experience, it might make sense to give a voice call (i.e. a DPCH CS radio access bearer) a higher priority than a PS connection. If this is applied in the example the final RxDiv setting would then be RxDiv dynamic on due to the higher priority of DPCH CS, which could e.g. extend the talk time.

According to one embodiment, the controller 603 decides about RxDiv activation based on radio access bearer activity, i.e., in other words, based on the amount of data transmitted via a certain radio access bearer. This may be desirable since the fact that a radio access bearer is established does not necessarily mean that there is (always, i.e. constantly) data being received by the communication terminal 600 on that radio access bearer. For example, via a PS radio access bearer, data is typically only received from time to time. Thus, according to one embodiment, it is detected (e.g. by the detector 602) whether there is activity on the established radio access bearers and only active radio access bearers are included in the decision. This does not necessarily have to be done RAB specific but, for example, for a specific physical channel type. For example if there are no HSDPA packets for a certain time the HSDPA receiver is declared as being inactive for the RxDiv decision, i.e. all combinations including a HSDPA physical channel are disregarded in the decision.

Radio access bearer specific activity detection can for example be based on the transport format indicators (TFCI) which indicate on which transport channels packets are received. This can be applied to all radio access bearer types (not only for PS). For example, for a signaling radio access bearer, which typically is active very rarely, a detected activity might trigger RxDiv on for a short time period to have the best possible receiver performance in case an important signaling/control message was not decodable and a retransmission is coming If there are no packets on a radio access bearer for a certain time this radio access bearer is then declared as inactive and is not considered in the decision whether to activate RxDiv.

The activity indicator can also be extended to the content of the packets on a radio access bearer. For example, in a voice call on a DPCH CS radio access bearer between the communication terminal 600 with another communication terminal there are frequently packets due to the CS nature of the radio access bearer. However, there are usually phases where voice data is received because the user of the other communication terminal is talking and there are phases where, e.g., only comfort noise is received or DTX (Discontinuous Transmission) is used because the person on the other communication terminal is not talking as the user of the communication terminal 600 himself is talking. The data packets received are typically different (e.g. in size and content identifier) for these different phases and can be easily distinguished. Thus, for a phase where only or mostly comfort noise data packets are received the communication terminal 600 could consider the DPCH CS radio access bearer as being inactive and change as a result the RxDiv decision, lower the priority of the DPCH CS radio access bearer, change the RxDiv setting, change RxDiv trigger thresholds etc.

As described above, according to one embodiment, the communication terminal 600 is provided with mechanisms for an RxDiv on/off decision (or generally for a decision whether to turn a performance enhancement functionality on or off) providing a highly flexible detailed configuration possibility (RxDiv on/off/dynamic, trigger thresholds, etc.) for all combinations of radio access bearers (CS, PS, signaling, . . . ) and physical channel types, e.g. corresponding to receiver types (HSDPA, DPCH/DCH/Rel99). A priority indicator may be added for each radio access bearer and this priority may be considered in the RxDiv ON/OFF decision and the real activity (also with respect to the content of the received data) for each established radio access bearer can be determined and for example, only radio access bearer via which data is actively received are considered in the decision.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A communication terminal comprising:
 a determiner configured to determine, for at least one communication connection of the communication terminal, a type of the physical channel used by the communication connection and a type of data transmitted via the communication connection;
 a controller configured to control a receiver of the communication terminal to use a reception performance enhancement functionality for the at least one communication connection depending on the type of the physical channel and the type of data transmitted via the communication connection; and
 a memory storing, for each combination of a plurality of combinations of a type of physical channel of a plurality of physical channel types and a type of data of a plurality of data types transmitted via the communication connection, an indication specifying whether the reception performance enhancement functionality is to be used for the combination.

2. The communication terminal according to claim 1, wherein the reception enhancement functionality is at least one of receive diversity, equalization and interference cancellation.

3. The communication terminal according to claim 1, wherein the type of physical channel comprises the type of radio access technology according to which the physical channel is provided.

4. The communication terminal according to claim 3, wherein the type of physical channel specifies whether the physical channel is a HSDPA physical channel or a Re199/DCH physical channel.

5. The communication terminal according to claim 1, wherein the type of data is given by a transmission mode of the data.

6. The communication terminal according to claim 1, wherein the type of data includes whether the data is signaling data or useful data.

7. The communication terminal according to claim 1, wherein the type of data is the type of a communication service in context of which the data are transmitted via the communication connection.

8. The communication terminal according to claim 1, wherein the controller is configured to control the receiver of the communication terminal to use the reception performance enhancement functionality if the memory stores an indication for the combination of the type of physical channel and the type of data transmitted via the communication connection indicating that the reception performance enhancement functionality is to be used.

9. The communication terminal according to claim 1, wherein the memory stores, for the combination of the type of physical channel and the type of data transmitted via the communication connection, a criterion which has to be fulfilled for the reception performance enhancement functionality to be used for the combination.

10. The communication terminal according to claim 9, wherein controller is configured to control the receiver of the communication terminal to use the reception performance enhancement functionality if the criterion is fulfilled.

11. The communication terminal according to claim 1, wherein the controller is configured to control the receiver of the communication terminal to use the reception performance enhancement functionality further depending on the amount of data transmitted via the communication connection.

12. A method for controlling a receiver of a communication terminal, the method comprising:
- determining, for at least one communication connection of the communication terminal, a type of the physical channel used by the communication connection and a type of data transmitted via the communication connection;
- controlling a receiver of the communication terminal to use a reception performance enhancement functionality for the at least one communication connection depending on the type of the physical channel and the type of data transmitted via the communication connection; and
- storing for each combination of a plurality of combinations of a type of physical channel of a plurality of physical channel types and a type of data of a plurality of data types transmitted via the communication connection, an indication specifying whether the reception performance enhancement functionality is to be used for the combination.

* * * * *